Figure 1:
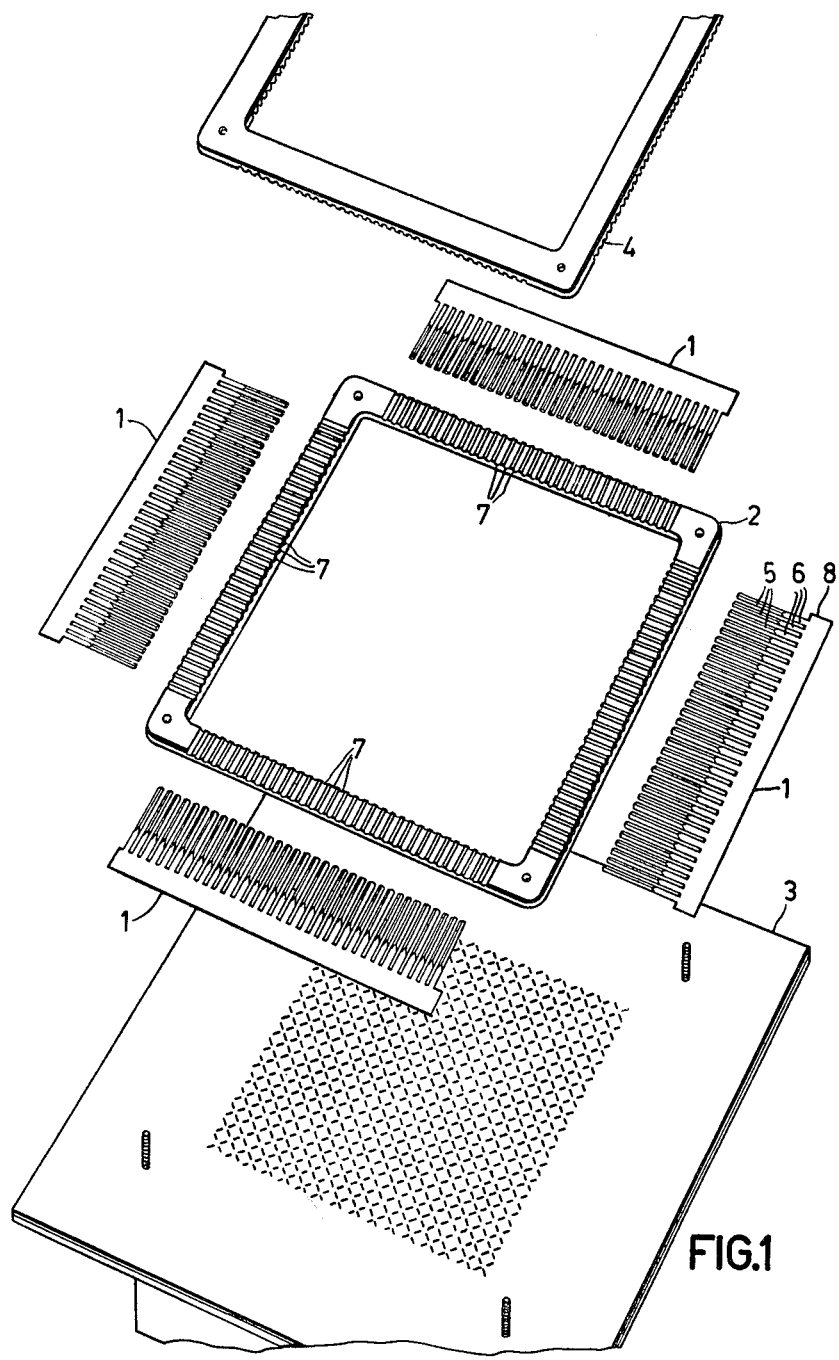

April 20, 1965  L. J. FOREMAN  3,178,802
METHOD OF MAKING MEMORY MATRICES
Filed Oct. 14, 1959  3 Sheets-Sheet 1

INVENTOR
LEONARD J. FOREMAN
BY
AGENT

April 20, 1965 L. J. FOREMAN 3,178,802
METHOD OF MAKING MEMORY MATRICES
Filed Oct. 14, 1959 3 Sheets-Sheet 2

INVENTOR
LEONARD J. FOREMAN

BY
AGENT

April 20, 1965   L. J. FOREMAN   3,178,802
METHOD OF MAKING MEMORY MATRICES
Filed Oct. 14, 1959   3 Sheets-Sheet 3

INVENTOR
LEONARD J. FOREMAN
BY
AGENT

3,178,802
METHOD OF MAKING MEMORY MATRICES
Leonard James Foreman, Duck's Walk, Twickenham, England, assignor to North American Philips Company, Inc., New York, N.Y., a corporation of Delaware
Filed Oct. 14, 1959, Ser. No. 846,427
Claims priority, application Great Britain Oct. 23, 1958
3 Claims. (Cl. 29—155.5)

This invention relates to information storage or memory matrices of the kind comprising a plurality of apertured magnetic cores with two or more conductors passing through each core, the cores being arranged in a number of parallel rows and parallel columns, with a wire, a so-called "X" wire, passing through the cores of each row and a wire, a so-called "Y" wire, passing through the cores of each column, and the X and Y wires being secured at each end to corresponding terminals provided on an insulating frame surrounding the matrix.

A known method of securing the X and Y wires in such a memory core matrix employs rows of small copper terminal strips produced by printed circuit techniques on the insulating frame. The X or Y wire is tensioned and at each end the wire is threaded through a fine passage, which is at right angles to the axis of the wire in the insulated frame and an adjacent hole in the respective terminal. The ends of the wires are individually soldered to the flat terminals.

With this existing method there are several disadvantages; the operator has to solder a large number of separate small joints at the terminals, this process is long and tedious and the solder frequently joins two or more adjacent terminals. Furthermore, each wire is bent through a right angle and the wire is therefore subjected to localised strains. The wire ends have then to be soldered with a soldering iron having an optimum temperature of substantially 400° C.±20° C.: this temperature is determined by the fact that the wire used in memory matrix construction is surrounded by an insulating coating which is also a solder flux and this flux coating melts at approximately 380° C. It is a disadvantage in that the quality of the joints thus made is not consistent and depends on many factors, e.g. the angle at which the soldering iron is held, the constancy of the soldering iron temperature, the ambient air currents in the room, the quantity of solder run on to the joint, the quickness of withdrawal of the iron after the eutetic point has been reached, and the frequent necessity of checking (e.g. by electro-pyrometric measurement) the temperature at which the joint is made.

It is an object of the present invention to mitigate these disadvantages and to provide a memory core matrix construction which is quickly threaded with straight X and Y wires, and lends itself to rapid production methods.

According to the present invention there is provided a memory core matrix of the kind set forth in which the insulating frame is divided in the plane of the matrix into two co-operating frame members having mating faces to be secured together, the mating face of at least one member having recesses for locating and securing in spaced relation a plurality of terminals with integral ferrules of tubular or substantially tubular form in which the ends of the X and Y wires are located and secured.

A method for manufacturing memory core matrices of the kind set forth comprised according to the invention the following steps: providing an insulating frame member having a mating face provided with recesses for terminal ferrules, locating said frame member on a suitable jig, placing magnetic cores in locating recesses provided on the jig in rows and columns aligned with the ferrule recesses of said frame member, providing four webs of terminals, each web consisting of ferrule parts, tongue parts and a common web part, locating each web so that the ferrules rest in the recesses in the frame member with the web and tongue parts projecting from the frame member, bringing a co-operating frame member into register with the mating face of the first mentioned frame member, threading a straight X or Y wire through each row or column of cores and through the ferrules aligned with each end thereof, tensioning the X and Y wires, crimping said ferrules to secure said wires, soldering said ferrules, and removing each web part so as to leave the tongue parts projecting separately.

Figure 2:
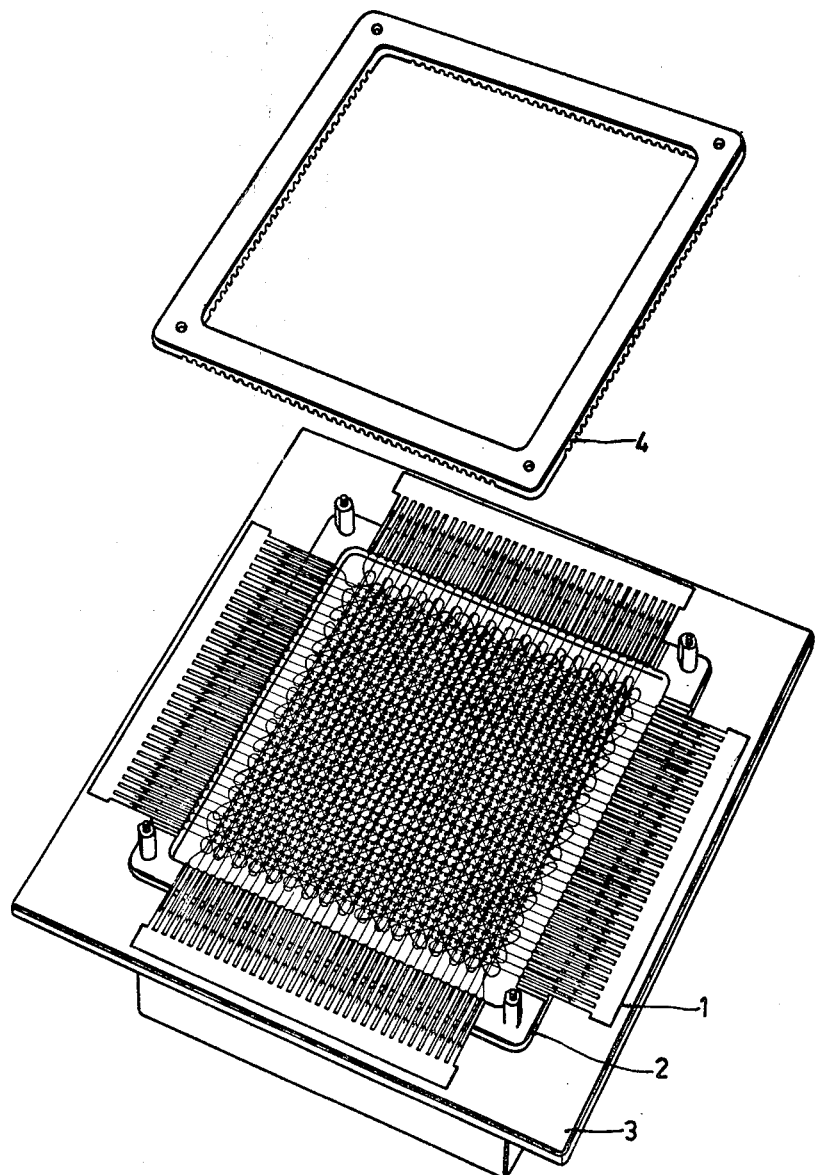
Figure 3:
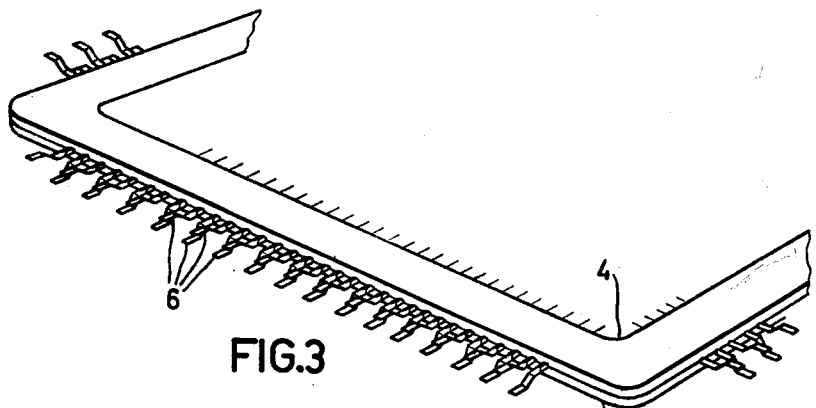
Figure 4:
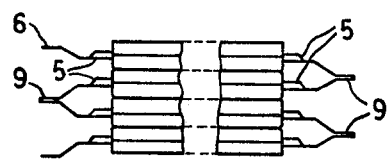
Figure 5:
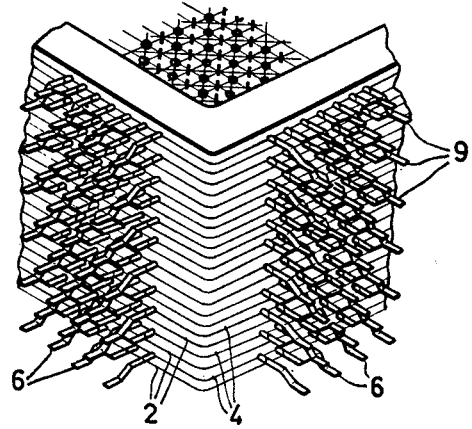

A specific embodiment of the invention will now be described by way of example with reference to the accompanying diagrammatic drawings, in which:

FIGURE 1 is an exploded view of the terminals' frame members and vacuum jig prior to assembly, FIGURE 2 shows the X and Y wires threaded and the co-operating frame member ready for securing, FIGURE 3 shows the bending of the tongues upwards and downwards, FIGURE 4 shows the method of joining such tongues when placed in stack formation, FIGURE 5 shows a corner of a number of information storage planes in stack formation.

Referring to the drawings, electrical terminals 1 are each composed of three integral parts, a substantially tubular ferrule 5 which is to be soldered to a wire, a flat tag or tongue 6 which is later to be used for connecting to a similar tongue on an adjacent matrix in a stack formation of these matrices, a third integral member, a web of metal strip 8 joins the terminals together, in comb like fashion and have small rectangular flat metal tongues 6 which join the web on to the tubular terminal ferrules 5. Each ferrule of a terminal is provided with a knurled interior which helps to hold the wire. The smaller the inner diameter of the ferrule the more readily the molten solder will rise when dipped in a solder bath; this is due to the capillary attraction exterted between the metal ferrule and the rising molten solder and has the action of excluding air from the joint and preventing subsequent oxidation and corrosion.

The main securing members for the terminals of the memory matrix are two rectangular synthetic resin bonded frame members 2 and 4, consisting of frames which are clamped together. Each frame member has a series of recesses 7 along a central portion of each of the four inner sides of the frame member, these are the recesses in which the ferrules of the terminals 5 are clamped. The frame members are brought into register so that corresponding recesses co-operate to provide passages in which are held the ferrule parts of the terminals.

The ferrite cores are held in place on a suitable jig, for example, a vacuum jig as described in patent specification 777,676, and the first insulating frame 2 is placed in position. In a set of recesses 7 are placed the ferrules 5 of a web of tubular terminals 1. The ferrules of each web may be held in position, at least during assembly, by means of a strip of adhesive painted on to the recesses. Another similar insulating frame member 4 is placed in position and secured. The X and Y cross wires are threaded through the ferrules and cores. The X and Y wires are correctly tensioned and the ferule portions of the terminal web crimped. Diagonal readout wiring is threaded and secured. The tongues and adjacent integral ferrule ends are then dipped in an ultrasonic soldering bath one side at a time. When a flux-coated wiring is used, a molten solder temperature of preferably 400° C. is desirable to melt the insulating flux coating and ensure a good electrical joint. The web part of the terminal tags 8 is now detached by means of a cutting tool.

The matrix may then be bolted into a stack formation (FIGURE 5) consisting of a plurality of matrices as described, and the tinned tongues projecting from the ferrules are bent alternately upwards and downwards as in FIGURE 3 so as to connect with the tags on the next matrix FIGURE 4. The tongues of the complete stack assembly may then be dipped in the solder bath one side at a time to make the final plane-to-plane wiring connections.

In the specification the expression "tubular" is intended to include ferrules that are formed by bending the metal into the shape of a tube or cylinder having a butt joint, and the expression "substantially tubular" includes that case where such a butt joint is replaced by a gap which however is restricted to a width less than the diameter of the wire used so that the wire is unable to escape through the butt joint gap.

What is claimed is:

1. A method of manufacturing a memory core matrix having four webs of preformed terminals, each having ferrule parts, tongue parts and a common web part comprising the following steps: providing a first rectangular insulating frame member having a mating face provided with recesses for the terminal ferrules along the periphery thereof, locating said frame member on a suitable jig, placing magnetic cores in locating recesses provided on the jig in rows and columns aligned with the ferrule recesses of said frame member, locating each web so that the ferrules rest in the recesses in the frame member with the web and tongue parts projecting from the frame member, bringing a cooperating second rectangular frame member into register and securing the same with the mating face of the first-mentioned frame member to securely hold said terminal ferrules, threading straight X and Y wire through their respective columns and rows of cores and through the ferrules aligned with each end thereof, tensioning the X and Y wires, crimping said ferrules to secure said wires, soldering said ferrules, and removing each web part so as to leave the tongue parts projecting separately.

2. A method of manufacturing a memory core matrix as claimed in claim 1 wherein the soldering is carried out by simultaneously dip-soldering all the terminals along one side of the frame.

3. A method of manufacturing a memory core matrix as claimed in claim 2 wherein said dip-soldering takes place in an ultrasonic soldering bath.

References Cited by the Examiner
UNITED STATES PATENTS

| | | | |
|---|---|---|---|
| 2,438,959 | 4/48 | Bartelheim et al. | 29—155.55 X |
| 2,784,391 | 3/57 | Rajchman et al. | 340—174 |
| 2,871,551 | 2/59 | Harris | 29—155.55 |
| 2,877,540 | 3/59 | Austen | 29—155.5 |
| 2,878,463 | 3/59 | Austen | 340—174 |
| 2,914,840 | 12/59 | Damiano | 29—155.5 |
| 2,961,745 | 11/60 | Smith | 29—155.5 |
| 2,985,948 | 5/61 | Peters | 29—155.5 |
| 3,017,615 | 1/62 | Smith | 29—155.5 X |
| 3,029,766 | 4/62 | Jones | 29—155.5 X |

FOREIGN PATENTS 777,676 6/57 Great Britain.

WHITMORE A. WILTZ, *Primary Examiner.*

EVERETT R. REYNOLDS, JOHN F. CAMPBELL,
*Examiners.*